United States Patent
Riedel

[15] 3,675,874
[45] July 11, 1972

[54] FILM THREADING MECHANISM FOR CINEMATOGRAPHIC APPARATUS

[72] Inventor: Wolfgang Riedel, Winnenden, Germany

[73] Assignee: Robert Bosch Photokino GmbH, Stuttgart, Unterturkheim, Germany

[22] Filed: Aug. 7, 1970

[21] Appl. No.: 62,036

[30] Foreign Application Priority Data

Aug. 14, 1969    Germany......................P 19 41 319.5

[52] U.S. Cl............................................................242/192
[51] Int. Cl.................................................B65h 17/24
[58] Field of Search......... 242/192, 195, 197, 210, 206, 207, 242/208, 209, 71.1; 352/72, 73, 78, 157, 158; 274/4 B, 4 C, 11 B, 11 C

[56] References Cited

UNITED STATES PATENTS

| | | | |
|---|---|---|---|
| 3,429,518 | 2/1969 | McKee | 352/158 X |
| 3,536,276 | 10/1970 | Bundschuh et al. | 242/192 |
| 3,550,881 | 12/1970 | Roman | 242/192 |
| 3,558,028 | 1/1971 | Bunting | 242/209 |

Primary Examiner—George F. Mautz
Attorney—Michael S. Striker

[57] ABSTRACT

Automatic film threading mechanism for use in motion picture projectors wherein a motor-driven belt can rotate the supply reel in a direction to pay out the convoluted film. The leader of the outermost convolution is intercepted by the tip of a slide reciprocable radially of the supply reel by a transmission including a friction clutch which insures that the tip engages the outermost convolution with a given force irrespective of the diameter of such convolution. The slide directs the leader into a film channel wherein the leader advances into the range of a claw pull-down 9 Claims, 3 Drawing Figures INVENTOR
Wolfgang RIEDEL By

*[signature]* his ATTORNEY

FILM THREADING MECHANISM FOR CINEMATOGRAPHIC APPARATUS

BACKGROUND OF THE INVENTION

The present invention relates to cinematographic apparatus, particularly to projectors for motion picture film. Still more particularly, the invention relates to improvements in automatic film threading mechanisms for use in projectors for motion picture film.

It is already known to provide in an automatic film threading mechanism a drive which moves a belt into engagement with the outermost convolution of film on a supply reel so that the belt can rotate the reel in a direction to pay out the film, and a pivotable one-armed lever which can be moved into engagement with the outermost convolution downstream of the point where the film is engaged by the belt whereby the lever deflects the leader of film into a channel defined by one or more stationary guides. The thus deflected leader is thereupon engaged by the film transporting mechanism and is transported toward engagement with the core of the takeup reel. The tip of the lever resembles a wedge and has a surface which directs the leader into the channel wherein the leader advances past the claw pull-down, past the gate, and on toward the takeup reel.

A drawback of such film threading mechanisms is that the angular position of the lever during engagement with the outermost convolution of film on the supply reel depends on and varies with the diameter of the outermost convolution. Thus, if the convoluted film is rather short, the diameter of the outermost convolution is small and the angular position of the lever is different from the position which the lever assumes when its tip engages the outermost convolution of a long film. Consequently, the lever is not always capable of properly directing the leader into the channel wherein the leader advances toward the claw pull-down. It was found that satisfactory threading of the film is insured only when the angle between the film directing surface of the lever and the foremost portion of the channel at least approximates a certain value. Consequently, the just described film threading mechanisms will operate satisfactorily only when the projector is used with supply reels each of which contains a supply of convoluted film having a fixed length. Furthermore, the designer of the projector has little freedom in selecting the position of the pivot for the lever; the pivot cannot be placed too far away from the reel because the length of the lever and its space requirements increase with increasing distance between the pivot and the axis of the reel.

SUMMARY OF THE INVENTION

An object of the invention is to provide a cinematographic apparatus, particularly a projector for motion picture film, with a novel and improved automatic film threading mechanism whose operation is not dependent on the diameter of the film which is convoluted on the supply reel.

Another object of the invention is to provide a film threading mechanism which is simpler, more reliable and more versatile than presently known film threading mechanisms.

A further object of the invention is to provide a film threading mechanism which need not utilize a film engaging lever.

An additional object of the invention is to provide a film threading mechanism which can be installed in presently known cinematographic apparatus.

Still another object of the invention is to provide a film threading mechanism which can control the movements of leaders on large or small rolls of convoluted motion picture film with the same degree of accuracy.

The invention is embodied in a cinematographic apparatus which comprises a housing, a supply reel rotatably mounted on the housing and supporting a supply of convoluted motion picture film whose leader constitutes the free end portion of the outermost convolution, and a novel film threading mechanism which comprises guide means defining a first path for the leader (the leader advancing along such path moves into the range of the film advancing element in a customary film transporting mechanism), drive means for rotating the reel in a direction to pay out the film, and deflector means for directing the leader into the first path. The deflector means comprises a film engaging element which is movable toward and away from the outermost convolution of the film along a second path at least a portion of which is straight and preferably extends at least substantially radially of the reel, and displacing means (preferably including a friction clutch) for moving the film engaging element along the second path whereby the tip of the film engaging element deflects the leader into the first path when it engages the outermost convolution while the reel rotates in the direction to pay out the film.

Since the film engaging element moves along a straight path which preferably extends radially of the supply reel, the angle between its film directing surface and the first path remains unchanged irrespective of the diameter of outermost convolution of film on the reel. Also, the reciprocable film engaging element requires less room than a lever, and the designer of the apparatus has more freedom in selecting the position of the reciprocable element with reference to the spindle for the supply reel.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
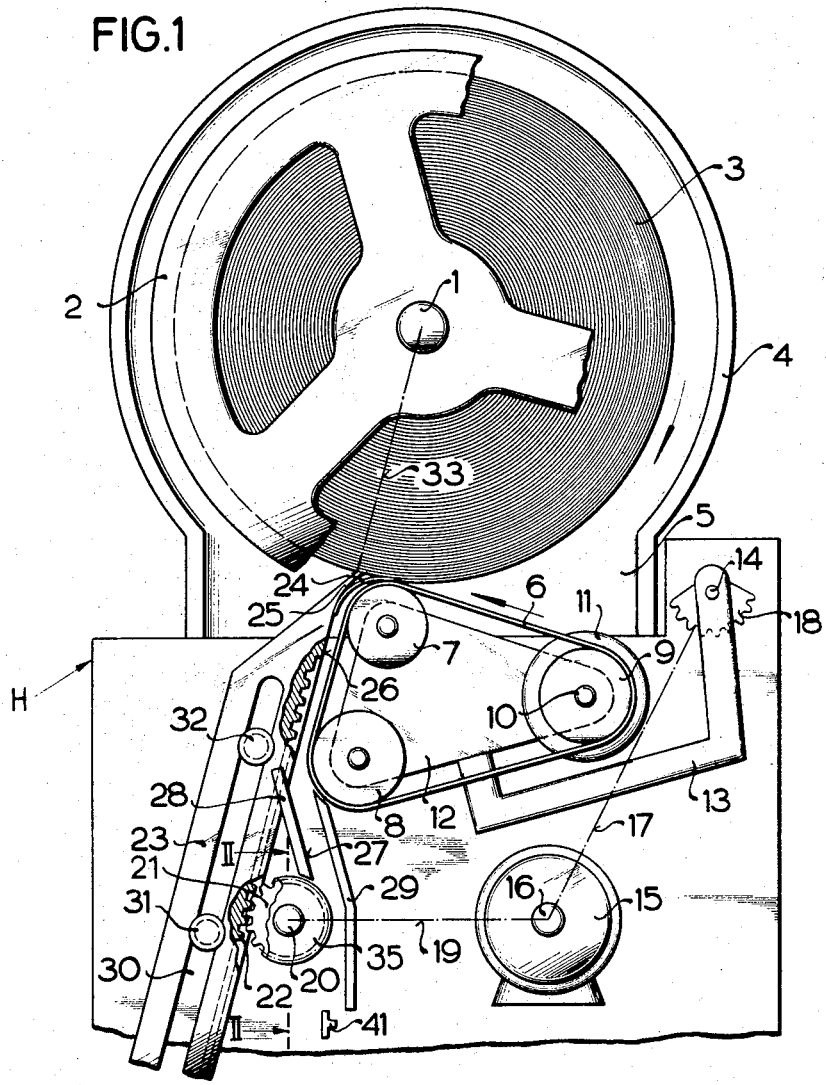
FIG. 1 is a fragmentary elevational view of a cinematographic apparatus having a film threading mechanism which embodies one form of the invention.

Referring to FIG. 1, there is shown a portion of a cinematographic apparatus, such as a motion picture film projector, which comprises a housing H supporting a spindle 1 for a reel 2 containing a supply of convoluted motion picture film 3. The leader (i.e., the free end portion) of the outermost convolution of the film 3 is shown at 24. The reel 2 is surrounded by a magazine or cassette 4 whose lower end is open, as at 5, to permit entry of a drive which serves to rotate the reel 2 in a direction to pay out the film. The drive comprises an endless belt 6 which is trained over pulleys 7, 8 and 9 mounted on a triangular plate-like carrier 12 pivotable about the axis of the shaft 10 for the pulley 9. This pulley is driven by an electric motor 11 mounted in the housing H. When the motor 11 is on, the belt 6 travels in a counterclockwise direction and the reel 2 rotates in a clockwise direction (both directions are indicated by arrows) when the carrier 12 is pivoted to the operative position shown in FIG. 1. Such pivoting is effected by a lever 13 which is mounted on a pivot pin 14 of the housing H and the free arm of which supports the carrier 12 from below. The means for pivoting the lever 13 in a clockwise direction to the position shown in FIG. 1 includes a prime mover 15, preferably a reversible electric motor, having an output shaft 16 which drives a gear segment 18 on the upper end of the lever 13 by way of a transmission schematically indicated by the phantom line 17. This transmission includes a pinion which meshes with the gear segment 18 and a friction clutch (not specifically shown) which becomes operative when the lever 13 reaches the illustrated position. Thus, the motor 15 can continue to operate after the belt 6 moves into engagement with the outermost convolution of the film 3. Since the motor 15 is reversible, it can pivot the lever 13 in either direction.

Figure 3:
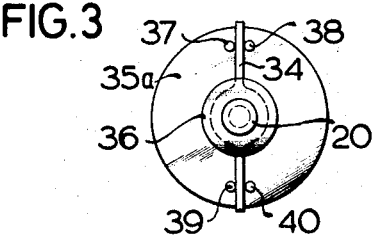
FIG. 3 is an end elevational view as seen in the direction of arrow III in FIG. 2.
Figure 2:
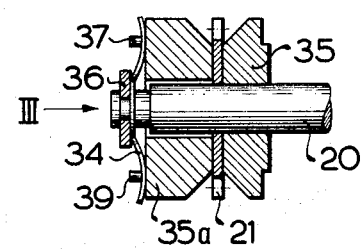
FIG. 2 is an enlarged sectional view as seen in the direction of arrows from the line II—II of FIG. 1.

The automatic film threading mechanism of the motion picture projector further comprises deflector means which serves to direct the leader 24 of the film 3 into a path 27 defined by two guides 28, 29 which are mounted in the housing H. Once the leader 24 enters into and advances along the path 27, the perforations of the film 3 are engaged by a suitable film transporting mechanism, for example, a mechanism including a customary claw pull-down 41, which thereupon continues to transport the film along the predetermined path so that the leader can be automatically connected to the core of a takeup reel, not shown. The deflector means includes a slide-like film engaging element 23 whose blade or wedge-like tip 25 can be moved into engagement with the outermost convolution of the film 3 slightly downstream of the point of engagement between the film 3 and the belt 6. The film directing surface 26 of the slide 23 then causes the leader 24 to travel along such surface and to automatically enter the path 27 defined by the stationary guides 28 and 29. The slide 23 is formed with an elongated slot 30 for two fixedly mounted guide pins or posts 31, 32 which confine the slide to movement along a straight path as indicated by the phantom line 33. This path extends at least substantially radially of the reel 2. The displacing means for moving the slide 23 up or down along the posts 31, 32 includes the aforementioned motor 15, its output shaft 16 and a transmission which is indicated by a phantom line 19. This transmission includes a straight toothed rack 22 which is preferably recessed into the film directing surface 26 of the slide, a pinion 21 which meshes with the rack 22 and is mounted on a shaft 20, and a friction clutch which is shown in FIGS. 2 and 3. The friction clutch is interposed between the shaft 20 and the pinion 21 so that, when the tip 25 of the slide 23 engages with and is arrested by the outermost convolution of film 3 on the reel 2, the motor 15 can continue to operate but the pinion 21 is then at a standstill. An advantage of the illustrated rack 22 is that it cannot interfere with the movement of leader 24 along the film directing surface 26 so that the leader can readily enter the path 27 defined by the guides 28, 29 when the motor 11 drives the belt 6 and the motor 15 maintains the belt in engagement with the outermost convolution of the film. The pinion 21 is mounted at a level below the guide 28 which crosses the film directing surface 26. The uppermost portion of the path 27 is straight and extends along the right-hand side of the guide 28; this guide forms with the guide 29 a narrow channel in which the leader 24 travels toward the claw pull-down 41. The path 27 makes an oblique angle with the path 33.

An important advantage of the reciprocable film engaging slide 23 is that the oblique angle between the surface 26 and the right-hand surface of the guide 28 (path 27) remains unchanged in each position of the slide. Also, the angle of deflection of the leader 24 from the circular path around the spindle 1 into the path along the surface 26 is also constant, irrespective of the diameter of the fully convoluted film 3. The extent of straight-line movement of the slide 23 along the path 33 (radially of the reel 2) at least equals but can exceed half the difference between the diameter of the longest film and the diameter of the shortest film which is intended to be stored on a reel 2. Otherwise stated, the extent of straight-line movement of the slide 23 radially of the shaft 1 at least equals the difference between the radii of the longest and shortest films which are to be viewed in the improved projector. The slide 23 constitutes a very simple but highly reliable and efficient film engaging and directing element which is superior to presently known film directing levers. Such levers are pivotable into engagement with the outermost convolution of the film so that the angle of deflection of the leader from the next-to-the-outermost convolution varies whenever the reel which stores a certain length of convoluted film is replaced with a reel storing a longer or shorter film. Moreover, the angle of deflection of the leader from travel along a pivotable lever to travel in a channel between stationary guides also varies as a function of the length of convoluted film. All this is avoided by the simple expedient of utilizing a slide-like film engaging and directing element which reciprocates radially or substantially radially of the reel.

The aforementioned friction clutch of the transmission 19 is shown in FIGS. 2 and 3. The clutch comprises a disk 35 which is fixed to and rotates with the shaft 20 when the motor 15 is on, a disk-shaped pressing member 35a which biases the pinion 21 against the disk 35, a two-armed leaf spring 34 which biases the pressing member 35a against the adjacent surface of the pinion 21, a split ring 36 or a like retainer for the spring 34, and two pairs of pins 37, 38 and 39, 40 each pair of which flanks one arm of the spring 34. The pins 37–40 are mounted on the pressing member 35a. The pinion 21 is rotatably mounted on the shaft 20 between the disc 35 and the pressing member 35a.

The operation:

When the projector is idle, the lever 13 permits the carrier 12 to descend so that the belt 6 is disengaged from the outermost convolution of the film 3 on the reel 2. The pinion 21 of the transmission 19 maintains the slide 23 in its lower end position in which the post 32 engages the surface at the upper end of the slot 30 and the tip 25 is remote from the outermost convolution of the film. In order to start the film threading operation, the user of the projector completes the circuit of the motor 15 so that the motor rotates in a direction to pivot the lever 13 in a clockwise direction by way of the transmission 17 whereby the lever 13 assumes the position shown in FIG. 1 and urges the belt 6 against the outermost convolution of the film 3. The aforementioned (non-illustrated) friction clutch in the transmission 17 permits the motor 15 to drive the output shaft 16 while the belt 6 bears against the film. The output shaft 16 of the motor 15 simultaneously drives the transmission 19 whereby the friction clutch of FIGS. 2 and 3 rotates the pinion 21 in a direction to move the rack 22 and the slide 23 upwardly until the tip 25 engages the outermost convolution immediately or closely downstream of the point where the outermost convolution is engaged by the belt 6.

In the next step, the user starts the motor 11 which drives the belt 6 in a counterclockwise direction so that the reel 2 rotates clockwise and moves the leader 24 against the surface 26 of the tip 25 not later than after the reel 2 completes a full revolution. The thus deflected leader 24 slides along the surface 26 and is automatically intercepted by the right-hand surface of the guide 28 which directs the leader into the path 27. The advancing leader 24 is thereupon engaged by the claw of the pull-down 41 and is automatically transported past the gate (not shown) and on toward the core of the takeup reel. A portion of the path 27 extends along the periphery of the pinion 21; however, such film cannot be damaged by the teeth of the pinion 21 because the latter is flanked by the disk 35 and pressing plate 35a(see particularly FIG. 2). The pinion 21 comes to a standstill as soon as the tip 25 engages the film 3 but the motor 15 can continue to drive the shaft 16 because the spring 34 permits the disk 35 to rotate with the shaft 20 relative to the pinion 21. The direction of rotation of the motor 15 can be reversed as soon as the leader 24 reaches the pull-down 41. This causes the tip 25 of the slide 23 to descend and the lever 13 is pivoted in a counterclockwise direction to permit the carrier 12 to move the belt 6 away from the film. The motor 11 is thereupon arrested. The means for reversing the direction of rotation of the motor 15 forms no part of the present invention.

The friction clutch of FIGS. 2 and 3 insures that the tip 25 of the slide 23 is biased against the outermost convolution with a predetermined force, irrespective of the diameter of such outermost convolution. The feature that the rack 22 of the transmission is recessed into the surface 26 of the slide 23 not only prevents damage to or contamination of the film but also results in savings in space in addition to such savings which are achieved by utilizing the slide 23 as a superior substitute for the levers of conventional film threading mechanisms.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a cinematographic apparatus, a combination comprising a housing; a reel rotatably mounted on said housing and supporting a supply of convoluted film whose leader constitutes the free end portion of the outermost convolution, the diameter of said outermost convolution being one of a predetermined range of diameters including a maximum and a minimum diameter; and a film threading mechanism, comprising guide means defining a first path for the leader, drive means for rotating the reel in a direction to pay out the film, and deflector means for directing the leader into said first path including a film engaging element movable toward and away from the outermost convolution of the film along a second path having an at least substantially straight portion along which said element moves during travel toward actual engagement with the outermost convolution, the length of said straight portion of said second path being at least equal to half the difference between said maximum and minimum diameters, and displacing means for moving said element along said second path, the orientation of said straight portion of said second path remaining substantially constant during the movement of said element irregardless of the diameter of the outermost convolution of film, whereby said element deflects the leader into said first path when it engages the outermost convolution of the film while the reel rotates in said direction.

2. A combination as defined in claim 1, wherein the straight portion of said second path extends at least substantially radially of said reel.

3. A combination as defined in claim 1, wherein said first path has a portion which makes an obtuse angle with the straight portion of said second path.

4. A combination as defined in claim 1, wherein said drive means comprises an endless belt which is movable into and from engagement with the outermost convolution of film on said reel.

5. In a cinematographic apparatus, a combination comprising a housing; a reel rotatably mounted on said housing and supporting a supply of convoluted film whose leader constitutes the free end portion of the outermost convolution; and a film threading mechanism, comprising guide means defining a first path for the leader, drive means for rotating the reel in a direction to pay out the film, and deflector means for directing the leader into said first path including a film engaging element movable toward and away from the outermost convolution of the film along a second path having an at least substantially straight portion and displacing means for moving said element along said second path whereby said element deflects the leader into said first path when it engages the outermost convolution of the film while the reel rotates in said direction, said displacing means comprising a rack-and-pinion drive.

6. A combination as defined in claim 5, wherein said rack-and-pinion drive comprises a rack rigid with said film engaging element and a driven pinion meshing with said rack.

7. In a cinematographic apparatus, a combination comprising a housing; a reel rotatably mounted on said housing and supporting a supply of convoluted film whose leader constitutes the free end portion of the outermost convolution; and a film threading mechanism, comprising guide means defining a first path for the leader, drive means for rotating the reel in a direction to pay out the film, and deflector means for directing the leader into said first path including a film engaging element movable toward and away from the outermost convolution of the film along a second path having an at least substantially straight portion and displacing means for moving said element along said second path whereby said element deflects the leader into said first path when it engages the outermost convolution of the film while the reel rotates in said direction, said displacing means comprising prime mover means and a transmission connecting said prime mover means with said film engaging element, said transmission including a friction clutch which permits said element to come to a standstill in response to engagement with the film while said prime mover means continues to drive said transmission means.

8. In a cinematographic apparatus, a combination comprising a housing; a reel rotatably mounted on said housing and supporting a supply of convoluted film whose leader constitutes the free end portion of the outermost convolution; and a film threading mechanism, comprising guide means defining a first path for the leader, drive means for rotating the reel in a direction to pay out the film, and deflector means for directing the leader into said first path including a film engaging element movable toward and away from the outermost convolution of the film along a second path having an at least substantially straight portion and displacing means for moving said element along said second path whereby said element deflects the leader into said first path when it engages the outermost convolution of the film while the reel rotates in said direction, said element having a film directing surface which directs the leader into said first path and said displacing means comprising a driven pinion and a rack meshing with said pinion, said rack being recessed into said film directing surface of said element.

9. In a cinematographic apparatus, a combination comprising a housing; a reel rotatably mounted on said housing and supporting a supply of convoluted film whose leader constitutes the free end portion of the outermost convolution; and a film threading mechanism, comprising guide means defining a first path for the leader, drive means for rotating the reel in a direction to pay out the film, and deflector means for directing the leader into said first path including a film engaging element movable toward and away from the outermost convolution of the film along a second path having an at least substantially straight portion and displacing means for moving said element along said second path whereby said element deflects the leader into said first path when it engages the outermost convolution of the film while the reel rotates in said direction, said displacing means comprising a portion along which the leader advances in said first path.

* * * * *